(12) United States Patent
Throup

(10) Patent No.: US 6,292,167 B1
(45) Date of Patent: Sep. 18, 2001

(54) ELECTRONIC GRAPHIC SYSTEM

(75) Inventor: David Throup, Lockeridge (GB)

(73) Assignee: Quantel Limited, Newbury (GB)

( * ) Notice: Subject to any disclaimer, the term of this patent is extended or adjusted under 35 U.S.C. 154(b) by 0 days.

(21) Appl. No.: 09/086,273

(22) Filed: May 28, 1998

(30) Foreign Application Priority Data

May 30, 1997 (GB) ................................................ 9711281

(51) Int. Cl.$^7$ .................................................... G09G 5/02
(52) U.S. Cl. .......................... 345/150; 345/153; 345/431
(58) Field of Search ................. 345/20, 22, 139, 345/150, 426, 431, 153, 156, 173, 138, 199; 348/577, 645, 687, 688

(56) References Cited

U.S. PATENT DOCUMENTS

| | | |
|---|---|---|
| 4,237,457 * | 12/1980 | Houldsworth . |
| 4,391,956 | 7/1983 | Scheetz . |
| 4,514,818 * | 4/1985 | Walker .................................. 345/429 |
| 4,829,455 | 5/1989 | Long et al. . |
| 5,412,402 * | 5/1995 | Searby et al. ......................... 345/153 |
| 5,469,536 | 11/1995 | Blank . |
| 5,506,603 | 4/1996 | Kawano et al. . |
| 5,568,596 * | 10/1996 | Cawley .................................. 345/431 |
| 5,872,667 * | 2/1999 | Bergen .................................. 382/254 |
| 5,907,640 | 5/1999 | DeLean . |
| 5,910,796 * | 6/1999 | Gornish ................................. 345/153 |
| 6,011,540 * | 1/2000 | Berlin et al. .......................... 345/153 |

FOREIGN PATENT DOCUMENTS

| | | |
|---|---|---|
| 0202014 | 11/1986 | (EP) . |
| 0245943 | 11/1987 | (EP) . |
| 2089625 | 6/1982 | (GB) . |
| 2275584 | 8/1994 | (GB) . |
| 57-067390 | 4/1982 | (JP) . |
| WO9422100 | 9/1994 | (WO) . |
| WO9710570 | 3/1997 | (WO) . |

* cited by examiner

*Primary Examiner*—Regina Liang
(74) *Attorney, Agent, or Firm*—Cooper & Dunham LLP

(57) ABSTRACT

An electronic graphic system 1 processes image data defining color values of a multiplicity of pixels that together form an image. The system 1 comprises a processing unit 14 in which image data from an image store 2 is processed with other image data from a store 9. The processing is effected on a pixel-by-pixel basis depending on control data in a control store 15 and on a predetermined gamma factor defining a relationship between color values and corresponding light values. The processing unit 14 thereby produces processed color value data representing a manipulated version of the image in which the light content of pixels has been varied by the other image data depending on the control data and the gamma factor.

17 Claims, 4 Drawing Sheets

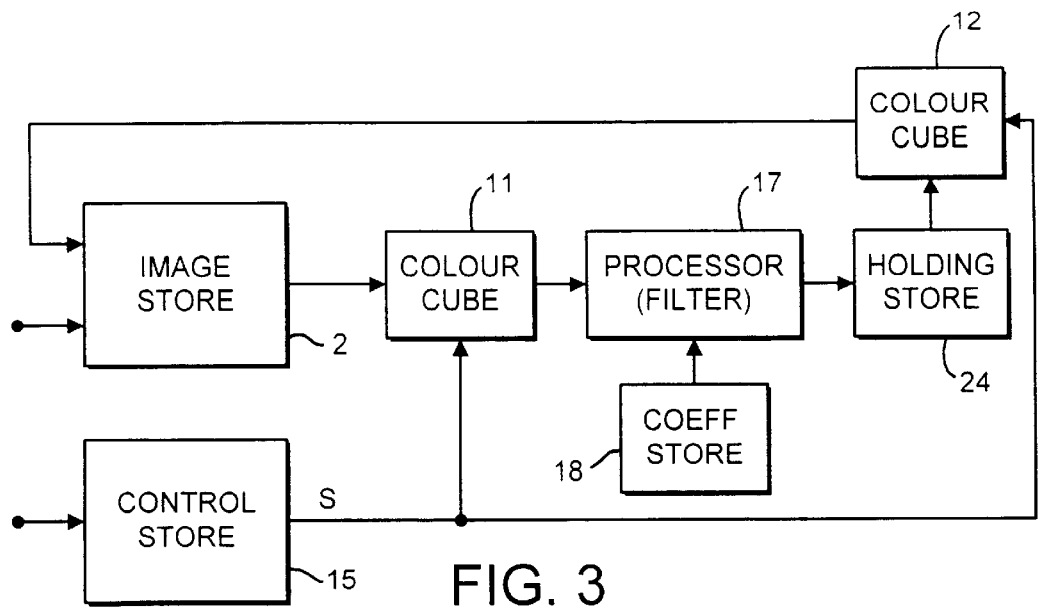
FIG. 3
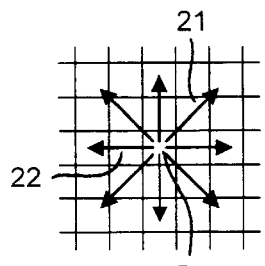
FIG. 4
| $a_{00}$ | $a_{01}$ | $a_{02}$ | $a_{03}$ | $a_{04}$ |
| --- | --- | --- | --- | --- |
| $a_{10}$ | $a_{11}$ | $a_{12}$ | $a_{13}$ | $a_{14}$ |
| $a_{20}$ | $a_{21}$ | $a_{22}$ | $a_{23}$ | $a_{24}$ |
| $a_{30}$ | $a_{31}$ | $a_{32}$ | $a_{33}$ | $a_{34}$ |
| $a_{40}$ | $a_{41}$ | $a_{42}$ | $a_{43}$ | $a_{44}$ |
FIG. 5

ELECTRONIC GRAPHIC SYSTEM

The invention relates to an electronic graphic system.

Electronic graphic or image systems in which the painting or drawing of a colour image can be simulated, or a portion of one image can be merged into another by electronic means are well known. One such graphic system is described in our British patent number GB-B-2,089,625 and corresponding U.S. Pat. No. 4,514,818, the teachings of which are incorporated herein by reference. This system includes a user operable input device which may be used by the user to select from a range of colours and a range of intensities and to choose from a set of notional drawing implements for use in the painting or drawing.

When a colour is chosen by the user, values representing the components of the selected colour are stored in a colour register. An implement is chosen by selecting from among different implement representations displayed on a display screen and the selected implement is defined by parameters conforming to a three-dimensional surface representing the profile of the implement. Generally speaking the implement profile will have a high centre falling away to a lower value toward the periphery of the profile although other profiles may, of course, be defined. The implement profile represents the notional distribution of colour which would be applied by the implement to the image over the area of the image which it covers.

The user operable input device is preferably a touch tablet and stylus combination. The touch tablet is arranged to generate position signals designating the position of the stylus relative to the touch tablet when the stylus is brought into proximity. When the stylus is applied to the touch tablet a pressure signal representing the pressure applied via the stylus to the touch tablet is output from the stylus and stored in a pressure signal register. Position signals are output at regular intervals from the stylus/touch tablet device. For some implements, representing say paint brushes, implement data is generated for each movement of the stylus by the distance between picture points or similar distance, whilst for other implements, say air brushes, implement data is generated at regular time intervals, even if the stylus is held stationary on the touch tablet.

When a position signal is produced, new video signals (pixels) are derived for every picture point in the patch covered by the selected implement. An image store is provided and each new pixel is written at the appropriate picture point in the store. Such new pixels are derived by a processing circuit in accordance with the selected colour data and the distribution of the selected implement, and in response also to the pressure applied to the stylus and to the value of the pixel previously stored at the respective picture point in the store.

The user, who it is envisaged would normally be an artist lacking experience in the use of computer based systems, paints or draws by choosing a desired colour and implement and then manipulating the stylus, causing the touch tablet to generate a series of position signals which define the path or positioning of the stylus. The processing circuit reads pixels from the image store for a patch of picture points in response to each position signal and these pixels are blended by the processor with signals representing the chosen colour in proportions depending upon the respective values of the brush profile and pressure. The blend is then written back to the picture store replacing the pixels previously stored therein.

In general, the blending process is carried out a number of times for each picture point in the image store whether the implement is moving or stationary (assuming in the case of the moving implement that the patch covered by the implement is larger than the spacing between picture points). The final proportion will depend on the number of processing operations performed per pixel.

To enable the user to observe his creation, the stored picture is read repeatedly and the pixels are applied to a TV-type colour monitor, so that the build-up of the picture can be observed. Of course such systems are not limited to TV-type formats and any suitable video format may be adopted. The system described avoids the problem of jagged edges in the image, an unpleasant stepping appearance normally associated with lines not lying horizontally or vertically in a raster display.

In electronic graphic systems an image is represented by data defining a multiplicity of pixels that together form the image. Each pixel is defined by the data as a value which typically represents a colour in a colour space (RGB, CMY, YUV for example). The data is input to the monitor where it is converted into voltage signals which are used to drive the monitor. In response to the voltage signals light is output from the screen of the monitor at points corresponding to the positions of respective pixels in the image. Thus the image is displayed on the screen of the monitor.

The relationship between the driving voltage signals and the light output from the screen of the monitor in response thereto is not linear and therefore the relationship between the data and the light output also is not linear. In fact the relationship between the value of light output (L) and the pixel colour value (P) defined by the data is of the form $$L=P^{\gamma} \qquad (1)$$

where $\gamma$=the "gamma" value of the monitor. Typically $\gamma$=2.2.

In the graphic system described in the aforementioned GB-B-2,089,625 and U.S. Pat. No. 4,514,818 new pixel data $P_{NEW}$ is created from colour data C combined with the pixel data $P_{OLD}$ initially stored in the store in accordance with the equation $$P_{NEW}=KC+(1-K)P_{OLD} \qquad (2)$$

where K is a value determined on a pixel-by-pixel basis for example by user manipulation of the input device.

It can be seen from equations (1) and (2) that the image as represented by the processed data will not correspond with the image as displayed on the screen of the monitor. Substituting light output values L for pixel colour values (P) in equation (2) and rearranging gives the equation $$L_{NEW}=(KC^{\gamma}+(1-K)L_{OLD}^{\gamma})^{1/\gamma} \qquad (3)$$

In other words changes in the processed data do not result in identical changes in the image as displayed.

Painting is primarily a visual operation and depends on the user interacting with the image as displayed in order to achieve a desired effect. It is of no concern to the user that the relationship is not linear between the colour value of a given pixel as defined by data within the system and the value of light output for that pixel from the monitor. If the user is not satisfied with the image displayed on the monitor he can simply adjust the colours until an acceptable result is achieved. Furthermore, because colour perception is relative, the difference between what would be achievable with a linear relationship and the result actually achieved will largely go unnoticed.

However, electronic graphic systems are not solely concerned with simulating painting in an electronic environment. Such systems are used in the processing of print-quality images (photographs) prior to the printing of those images for example in a magazine or other publication. A print quality image is an image of a resolution similar to that of a quality photograph obtained using a conventional camera, and may be represented in an electronic environment by data defining 8,000×10,000 pixels or more.

In the processing of photographs it is often desirable to achieve photo-realistic effects. For example the user may wish to simulate the effect of illuminating a scene with, say, a blue light. In the real world illuminating a scene with a blue light source will increase the intensity of blues in the scene, will change colours with a blue content closer to blue and will leave other colours substantially unaltered. In hitherto known systems this effect has been difficult to achieve. "Painting" a blue over the image electronically is equivalent to applying paint or ink to the surface of the photograph, which of course will tend to obscure the original image rather than enhance the colours. Realistic image blending and other effects such as realistic photographic defocus and grain effects are also difficult to achieve.

The invention aims to provide an improved electronic graphic system in which photo-realistic effects are more readily achievable.

According to one aspect of the invention there is provided an electronic graphic system for processing image data defining colour values of a multiplicity of pixels that together form an image, in which system the image data is processed with other image data, which processing is effected on a pixel-by-pixel basis depending on control data and on a predetermined gamma factor defining a relationship between colour values and corresponding light values, the processing thereby producing processed colour value data representing a manipulated version of the image in which the light content of pixels has been varied by the other image data depending on the control data and the gamma factor.

According to another aspect of the invention there is provided an electronic graphic system for processing image data defining a multiplicity of pixels that together form an image, each pixel having an image value in plural-dimensional image space, the data being processed by way of a processing circuit comprising a colour cube circuit configured to produce processed image data defining pixels each having an image value in the image space and together forming a manipulated version of the image, the colour cube circuit being connected to receive control data and to modulate the data in the image space depending on the control data.

According to another aspect of the invention there is provided a method of processing image data defining colour values of a multiplicity of pixels that together form an image, the method comprising processing the image data with other image data on a pixel-by-pixel basis depending on control data and on a predetermined gamma factor defining a relationship between colour values and corresponding light values in the image, and producing processed colour value data representing a manipulated version of the image in which the light content of pixels has been varied by the other image data depending on the control data and the gamma factor.

The above and further features of the invention are set forth with particularity in the appended claims and together with advantages thereof will become clearer from consideration of the following detailed description of exemplary embodiments of the invention given with reference to the accompanying drawings.

In the drawings:

FIG. 3 is a schematic diagram of the portion of the system reconfigured to apply a defocusing effect to an image;

FIG. 4 represents the spreading of a pixel during a defocusing effect;

FIG. 5 shows an array of filter coefficients;

Figure 1:
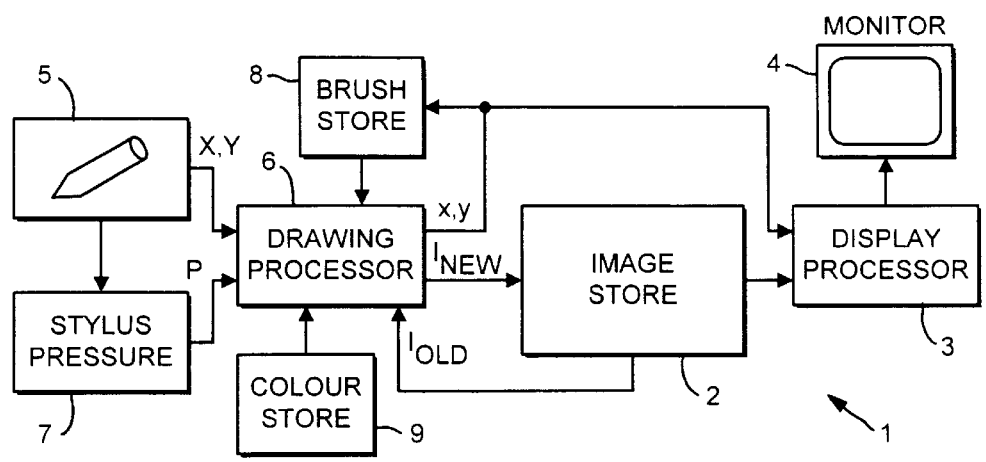
FIG. 1 is a schematic diagram of an electronic graphic system.

Referring now to FIG. 1 of the accompanying drawings, an electronic graphic system, indicated generally at 1, comprises an image store 2 for storing data defining one or more images including an image to be processed, a display processor 3 and a monitor 4. The contents of the image store 2 is capable of storing data representing an image in terms of 8,000×10,000 or more pixels. It is of course not possible to display such as image in its entirety on a commercially available monitor. The image store 2 is connected via a serial access port to the display processor 3 which is arranged to read selected data from the store 2 for display of the image represented thereby on the monitor 4. The display processor 3 may be arranged to read data for display using the techniques described in European patent application publication number EP-A-202,014 and corresponding U.S. Pat. No. 4,391,956 the teachings of which are incorporated herein by reference.

The system 1 also comprises a user operable stylus/touch tablet device 5 by which the user can modify the image data in the store 2, and hence the image represented thereby. As the stylus is drawn across the touch tablet signals representative of the instantaneous position X,Y of the stylus are output to a drawing processor 6. The display processor 3 and the drawing processor 6 are shown as separate entities in order to facilitate understanding by simplifying the following explanation. In practice the two processors 3, 6 may be provided as a single processing unit.

The drawing processor 6 is also arranged to convert the instantaneous X,Y position information from the stylus/touch tablet 5 into data representing an equivalent patch of locations x, y in the store 2. The equivalent location is defined in terms of a patch of store addresses and an offset. The offset is calculated as the difference between the store address and the position X,Y of the stylus on the touch tablet. The offset has both vertical and horizontal components each having values of less than one pixel.

As the user moves the stylus on the touch tablet the position data X,Y is continuously generated by the touch tablet 5 and delivered to the drawing processor 6 where it is converted into x,y data identifying patches of store addresses in the store 2. Each patch of addresses is centered over the location in the store equivalent to the corresponding X,Y position data generated by the touch tablet.

The stylus of the stylus/touch tablet device 5 also includes a pressure sensor that outputs a pressure related signal for storage as a parameter in a stylus pressure register 7. Modern stylus touch tablet devices are also capable of generating data defining the orientation (twist) and defining the angle of the stylus in relation to the touch tablet. These parameters may be stored as well as or instead of the pressure data in the stylus register for use by the processor.

The display processor 3 is arranged to generate data representing a menu of options for display together with the image or a portion of the image on the monitor 4. The display processor 3 is connected to receive x, y coordinate data from the drawing processor 6 (as shown) or x, y coordinate data directly from the stylus and touch tablet device 5. In response to the coordinate data the display processor generates data representing a cursor for display on the monitor 4. Movement of the stylus on the touch tablet results in corresponding movement of the cursor on the monitor. By manipulating the stylus/touch tablet the user may select options from the menu to which the display processor responds.

Notional drawing implements are predefined in the system 1 and are selectable by the user from the menu of options (not shown) generated by the display processor 3 and displayed on the monitor 4. When the user selects a particular implement, data defining a continuous three-dimensional shape covering a patch of pixels and representing the profile of the implement, as described in our above mentioned patents, is stored in a brush store 8.

The brush store 8 contains at least one array of data defining a drawing implement. Drawing with a single implement of a fixed size is unacceptable and the system is therefore arranged to enable data arrays for different sizes of the same brush to be available for use in painting or drawing. To this end the system comprises a library (not shown) of brush profiles in which brushes are defined by sets of reference data. When an implement is selected for use by the user data defining the profile of that implement is transferred to the brush store 8 for use by the drawing processor 6.

A selection of predefined colours is also provided in the displayed menu and the user may select one of these predefined colours or instead may define a colour of his own choosing. Data representing the selected colour is stored by the display processor 3 in a colour register or store 9. Alternatively, the colour store may be replaced with an image store for storing data representing another image to be combined with the image represented by the data in the image store 2.

The image store 2 also includes random access ports for random access writing or reading of data to and from the store 2 independently of the serial raster reading of data to the monitor 4. As the stylus is moved across the touch tablet, data at each addressed patch is read from the store 2 via the random access read port to the drawing processor 6. At the same time, brush shape data from the brush store 8 and colour data from the colour store 9 are also input to the drawing processor 6. The reading of the brush patch data from the brush shape store 6 and the colour data from the colour register 8 is synchronised to the generation of individual addresses within the patch of addresses by the drawing processor 6 which outputs said patch addresses to the brush store 8 and reads signals from the colour store 9.

In the drawing processor 6 the image data $I_{OLD}$ read from the image store 2 is processed with the colour data C, the brush data B and the stylus pressure data P to produce new image data $I_{NEW}$ which is written back to the image store 2.

One way in which the drawing processor 6 may process the image data is to interpolate the image data $I_{OLD}$ and colour data C using the product of the pressure data and the brush data as an interpolation co-efficient K to produce new data $I_{NEW}$ in accordance with the above discussed equation (2), namely $$I_{NEW}=KC+(1-K)I_{OLD} \quad (4)$$

This processing serves to add data representing a patch of colour to the image data in the store. In the displayed image the patch appears as if an area of colour has been stamped into the image. In the following this read-modify-write operation will be referred to as "stamping". The drawing processor 6 is arranged to stamp colour data into the image data at regular intervals of time or distance. Thus, as the stylus is moved over the touch tablet data representing a series of overlapping patches of colour ("stamps") is added to the image data in the store and appears in the displayed image as a continuous line or stroke. In the case where the colour store contains data representing an image, the result of applying the equation (4) to the data in the stores 2 and 9 on a pixel-by-pixel basis will be to combine the two image as if "painting" the image from the store 9 into the image in store 2.

Figure 2:
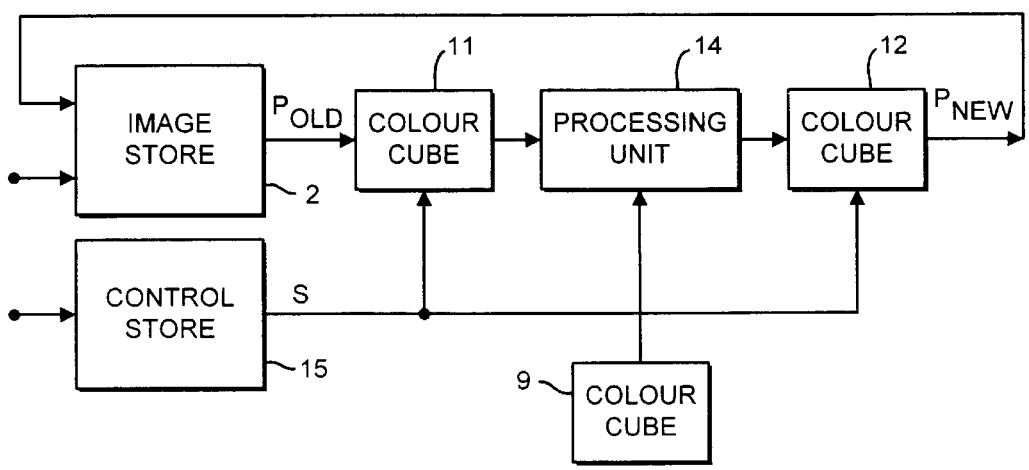
FIG. 2 is a schematic diagram of a portion of the electronic graphic system of FIG. 1 in greater detail.

FIG. 2 of the accompanying drawings shows part of the system 1 in greater detail. As shown in FIG. 2, the drawing processor comprises a first colour cube 11 connected to receive image data $I_{OLD}$ from the image store 2, a second colour cube 12 connected to input image data $I_{NEW}$ to the image store and a processing unit 14 between the two colour cubes. The system further comprises a control image store 15 of equal size to the image store 2 for storing data representing a monochrome control image or stencil S. The control store 15 is connected to output the control data S to the two colour cubes 11, 12 as will be described in greater detail hereinafter.

The image data in the image store 2 and the control data in the control store 15 may be loaded directly into the stores from an off-line bulk image data store (not shown). The control data may be regarded as representing a control image or stencil that identifies areas in the image defined by the data in the image store in which processing is to have an effect. Thus the control data represents a monochrome control image. Since the control data is monochrome image data it follows that the control data may be created by a user of the system "painting" the data into the control store in a similar manner to that described hereinabove with reference to FIG. 1 of the drawings.

The image data in the image store 2 defines each pixel as a colour value in terms of plural colour components. Of course any colour component format may be used including the red, green, blue (RGB) format used in many computers, the cyan, magenta, yellow (CMY) format used widely in printing, and the luminance, chrominance format (YUV) used widely in television. Thus initial image data may be supplied from any one of a number of different sources (not shown) in any one of a number of different sources, converted into the preferred format for the processor, say RGB, and then stored in the image store 2. Once the image data has been processed it may be reconverted back into its original format for storing in the source from which the initial data came. Of course, the image data may simply be "painted" into the image store 2 as described hereinabove with reference to FIG. 1 of the accompanying drawings.

Format converters are per se well known and need not be described in detail herein. An exemplary converter is described in European patent application published as EP-A-245,943 and corresponding U.S. Pat. No. 4,829,455, the teachings of which are incorporated herein by reference.

The data in the image store 2 defines each pixel in terms of a pixel colour P. The pixel colour data P is related to the light colour L that is actually output when the pixel is displayed on the monitor by the above discussed equation $$L=P^{\gamma} \quad (1)$$

If $P_{OLD}$ is the data output from the image store 2 then it follows from equation (1) that $$L_{OLD}=P_{OLD}{}^{\gamma} \tag{5}$$

where $L_{OLD}$ is the light colour value equivalent to the pixel colour value $P_{OLD}$. The first colour cube 11 serves to convert the pixel data $P_{OLD}$ from the store into the equivalent light colour value $L_{OLD}$ in accordance with equation (5). The light colour data is processed by the processing unit 14 in a manner which will be described in greater detail hereinafter to produce processed light colour data $L_{NEW}$ which is input to the second colour cube 12 for conversion back into corresponding pixel colour data $P_{NEW}$. It follows from equation (1) that $$P_{NEW}=L_{NEW}{}^{1/\gamma} \tag{6}$$

Therefore, the second colour cube 12 serves to convert the light colour data $L_{NEW}$ into the equivalent pixel colour value $P_{NEW}$ in accordance with equation (6). The data $P_{NEW}$ from the colour cube 12 is written back to the image store 2 replacing the data $P_{OLD}$ previously stored therein.

Generally speaking, a colour cube circuit provides a means by which a first colour represented by digital data in a first colour space may be converted into a second colour in a second colour space. The first and second colours may remain the same and the first and second colour spaces may be different (e.g. RGB and CMY) or the two colour spaces may be the same and the first and second colours may differ. Colour cube circuits are per se well known and need not be described in detail herein. An exemplary colour cube circuit is described in British patent application published as GB-A-2,275,584 and corresponding U.S. Pat. No. 5,568,596, the teachings of which are incorporated herein by reference.

The processing unit 14 is arranged to operate in one of a number of different ways depending on the effect to be achieved.

One effect that can be achieved is the addition of a user selected light colour $C^{\gamma}$ to a scene. This effect is achieved by multiplying the initial light data $L_{OLD}$ by a factor F to produce new light data $L_{NEW}$ in accordance with the equation $$L_{NEW}=F \cdot L_{OLD} \tag{7}$$

The factor F has a value equal to or greater than 1 and is determined in accordance with the equation $$F=1+S \cdot C^{\gamma} \tag{8}$$

where S is the control image data from the control store 15. It will be appreciated by those possessed of the appropriate skills from consideration of equation (8) that the control data S determines the severity or intensity of the effect of applying light colour $C^{\gamma}$ to the image. When K=0 no light colour $C^{\gamma}$ will be added to $L_{OLD}$, and when K=1 maximum light colour $C^{\gamma}$ will be added.

Substituting equation (8) into equation (7) gives the equation $$L_{NEW}=L_{OLD}(1+SC^{\gamma}) \tag{9}$$

Equation (9) represents the operation performed by the processing unit 14 when a user selected colour is to be added to a scene. This effect can be used for example to add highlights to a scene realistically and much more easily than has hitherto been possible.

Another effect that is possible is the removal of light of a selected colour from an image. By similar reasoning to that set out hereinabove with reference to equations (7) to (9) it can be shown that when light is to be removed, the processing unit 14 must perform an operation represented by the equation $$L_{NEW}=L_{OLD}(1-S+SC^{\gamma}) \tag{10}$$

since in a subtractive operation $$F=1-((1-C^{\gamma})S) \tag{11}$$

Light colour removal can be used to add "lowlights", i.e. shadows, to a scene much more easily than has hitherto been possible.

The system is not limited only to the above described simulation of "painting" with light. The light data produced by the colour cube 11 may be processed in several different ways to achieve effects that appear more realistic than has hitherto been possible by processing colour data.

One effect that may be achieved more realistically is that of simulating the blurring that is seen in unfocused areas of a photographic image. This effect, which will be referred to herein as "defocusing", can be used for example to blur or defocus the background of an image so as to emphasise the foreground subject of the image. Defocusing effects per se are known. However, hitherto defocusing effects have been applied to data representing image colour values. While this gives an acceptable result it is not photorealistic because in a conventional camera defocusing occurs as part of the image capturing process when light falls on a photographic medium. Therefore, applying a defocusing effect to data representing light values produces a defocused image which appears more like a defocused image (or an area thereof) originally captured as a photograph using a conventional camera.

FIG. 3 of the accompanying drawings shows the system reconfigured to defocus the image data in the image store 2. The processing unit shown in FIG. 2 is replaced in the system configuration of FIG. 3 by a filter 17 between the two colour cubes 11 and 12. The filter 17 is connected to receive data from a coefficient store 18, which data defines coefficients to be applied by the filter 17 to data from the colour cube 11 and thus defines the nature of the filtering performed by the filter.

Defocusing is effected, as shown in FIG. 4 of the accompanying drawings, by processing each pixel, e.g. pixel $P_{22}$, so that it contributes to surrounding pixels. In other words, the pixel $P_{22}$ is spread out over an area, as represented by the arrowed lines 20, 21 in FIG. 4, and thus contributes to several other pixels. This spreading is repeated for each pixel in the initial image.

The data in the coefficient store 18 defines an array of coefficients, such as the array 23 of coefficients $a_{00}$ to $a_{44}$ shown in FIG. 5 of the accompanying drawings. Each coefficient has a value between 0 and 1 inclusive and, assuming only defocusing is being effected by the filter, the sum of the coefficients will equal 1. The array, which may be larger or smaller than the array 22 shown in FIG. 5, may be "shaped" for example by defining the coefficients in accordance with say a circular function (in which coefficients within a circular boundary all have a maximum value, coefficients intersected by the boundary have a value determined by the position of the intersection, and coefficients outside the boundary have a zero value) or indeed any other shape. Selecting the size and shape of the array enables the filtering to simulate the defocusing that would occur in a conventional camera using a lens with an aperture of a given size and shape.

Each pixel in the processed image will receive contributions from several pixels in the initial image. The system therefore includes a holding store 24 to enable all the contributions from each pixel to be added together to produce the value of the processed pixel. The holding store could be as large as the image store 2, but by careful arrangement of the operation of the filter needs only to be as large as the area of pixels altered by the filter in a single filtering operation. Such arranging of the filter is well within the scope of a skilled person and need not be discussed in detail herein.

Once all contributions have been added together for a given pixel, the data is read from the holding store 24 through the colour cube 12 where it is converted back into colour data, and the thus processed colour data is then written back to the image store 2 replacing the data previously stored therein.

It will, of course, be appreciated that other spatial effects (and not just the effect of defocusing) may be realised simply by changing the coefficient data held in the coefficient store 18.

Another effect that may be achieved more realistically is that of applying texture to an image. The texturing may take one of several forms including the adding of a grain to simulate photographic grain effects, the adding of a weave to simulate painting on a canvas, and the adding of a watermark. The simulation of photographic grain, referred to hereinafter as "graining", will be discussed further by way of example.

A photographic film comprises grains of different sizes that are sensitive to light. In an area exposed to light of uniform intensity the density value of the image will be substantially uniform but the density value of individual grains will not all be equal to the density value of the area. Instead, the density value of individual grains will vary by a random amount within a small density range. On average the density value of individual grains will be equal to that of the area. The random variation of grain density values occupies a density range which is substantially constant regardless of the density of the image area. For example, if the grain covers a density range of 0.01 units this value will remain the same whether the image area has a density of say 0.1 units or 1.0 units. The grain has the same density characteristic regardless of the actual density of the image. (This may not be true for areas of zero density where the grains may be removed entirely to leave only the transparent carrier film, but in most situations it holds true.) Thus, graining can be regarded as noise within a density range that modulates the image density.

In hitherto known systems graining effects have been achieved simply by modulating the colour values by a small random amount. While this approach can give the appearance of graining it is not photo-realistic. This is because the graining in a photographic image is a density related parameter (as described above) and because does not take account of the texture that the grains themselves add to the image. The variation in grain size within a film gives a random texture to an image on film. Also, within a given grain the density will vary from a relatively low value at the boundary of the grain to a relatively high value in the middle of the grain.

In an image represented by 10,000×8,000 pixels or more, the area of a single grain will almost certainly not correspond to the area represented by one pixel, the area may be smaller than a single pixel or as large as several pixels. A more photorealistic graining effect may be achieved if all of these factors are taken into account.

Figure 6:
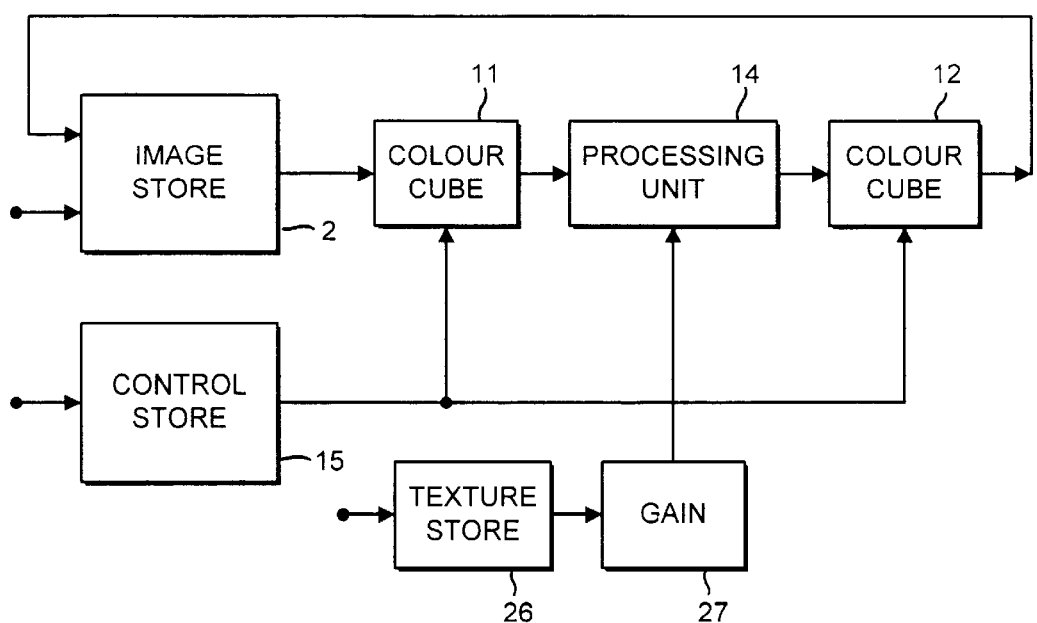
FIG. 6 is a schematic diagram of the portion of the system reconfigured to apply a texturing effect to an image.

To this end, as shown in FIG. 6 of the accompanying drawings, the system comprises a texture store 26 for storing data representing the grain modulation to be applied by the processing unit 14 in order to achieve a desired graining effect. The data in the texture store 26 represents grain density values. Since graining is essentially random, the store 26 need not be as large as, say, the image store 2. Instead, the texture store 26 may store grain density values for a relatively small area (say, 500×400 pixels) so that the same density data is applied to several areas of the image in order to achieve the desired graining effect. Of course, in other texturing effects, such as the application of a water mark, it may be necessary to use a texture store equal in size to the image stored in the image store 2.

The texture store 26 is connected to receive data from an off-line source (not shown) thus enabling data defining graining at different levels of grain coarseness to be loaded into the store. Also, the texture store 26 may be connected to supply the graining density data to the processing unit 14 via a multiplier 27 that applies a user determined gain to the data. The multiplier enables the amplitude of the grain modulation to be varied so that the graining effect is more or less noticeable in the final image. In this way, the size of the grain may be controlled by way of selection of the data for storage in the texture store 26 and the prominence of the graining may be controlled by way of the multiplier 27.

The processing unit 14 is arranged to operate on data representing density values D. Pixel density D is related to the pixel light value L by the equation $$D = \log(1/L) \qquad (12)$$

From equation (1)

$$L = P^\gamma$$

therefore $$D_{OLD} = \log\left(\frac{1}{P_{old}^\gamma}\right) \qquad (13)$$

It follows from equation (13) that $$D_{OLD} = \log P_{OLD}^{-\gamma} \qquad (14)$$

which is the operation performed by the colour cube 11, and that $$P_{NEW} = 10^{-\frac{D_{NEW}}{\gamma}} \qquad (15)$$

which is the operation performed by the colour cube 12. That is, the colour cubes 11, 12 are arranged to convert the image data between pixel colour values (P) and density values (D).

The processing unit is arranged to add the grain density data Dg to the pixel density data $D_{OLD}$ from the image store 2 via the colour cube 11 in accordance with the equation $$D_{NEW} = D_{OLD} + Dg \qquad (16)$$

In image data representing the density of an image, white has a density value of zero and black has a density value of infinity. It follows that processing the image data to add grain density data in accordance with equation (16) will produce data representing the image in which more grain is noticeable in the highlights (colours closer to white) than in the shadows. This is photorealistic because grain is more noticeable in lighter areas than it is in darker areas of a photograph. Thus, by converting the pixel colour data P into density data D by way of the logarithmic equation (14), adding grain density data thereto by way of equation (16), and then converting the thus produced density data back into colour data by way of the equation (15), all on a pixel-by-pixel basis, a realistic graining effect is achieved.

It will, of course, be appreciated that the processing unit in the configuration shown in FIG. 6 of the drawings may instead produce such texturing effects as the application of a watermark or a weave to an image simply by replacing the graining data in the texture store with data representing the density modulation of the watermark or the weave as appropriate. The equations (14) and (15) remain the same and equation (16) need only be altered to the extent that Dg instead represents the watermark or weave density data held in the texture store.

It is possible to simplify some of the above discussed equations so as to eliminate the light/density components and express $P_{NEW}$ in terms of $P_{OLD}$. This also enables the system to be simplified as will now be explained.

Figure 7:
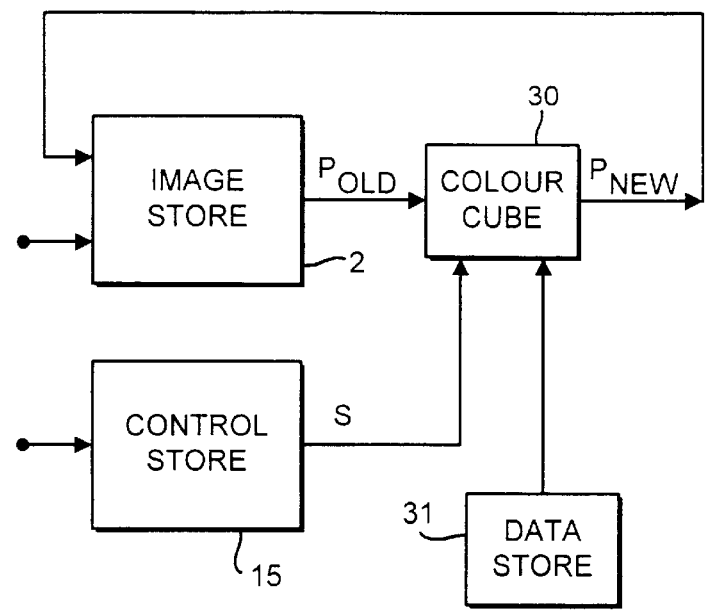
FIG. 7 is a schematic diagram of the portion of the system reconfigured to operate in a different manner.

FIG. 7 of the accompanying drawings shows a simplified version of the system 1. In place of the two colour cubes 11, 12 and the processing unit 14 is a single colour cube 30 connected to receive data from the image store 2, a data store 31 and the control store 15. The data store 31 is equivalent to the colour store 9 when the system is configured to perform the above described "painting" and is equivalent to the texture store 26 when the system is configured to perform the above described "graining" or other texturing effects. In this configuration of the system the initial pixel data $P_{OLD}$ is read directly from the image store 2, transformed by the single colour cube 16 to produce new pixel data $P_{NEW}$ which is then written directly back into the image store 2 to replace the corresponding initial pixel data $P_{OLD}$ previously stored therein.

Consider first the "painting" equations (9) and (10). The relationship between $P_{NEW}$ and $L_{NEW}$ can be determined from equation (1) to be $$P_{NEW}=L_{NEW}^{1/\gamma} \quad (17)$$

Substituting equation (17) into equations (9) and (10) gives the equations $$P_{NEW}=(P_{OLD}^{\gamma}(1+SC^{\gamma}))^{1/\gamma} \quad (18)$$

and $$P_{NEW}=(P_{OLD}^{\gamma}(1-S+SC^{\gamma}))^{1/\gamma} \quad (19)$$

The equations (17) and (18) can be simplified to give the equations $$P_{NEW}=P_{OLD}(1+SC^{\gamma})^{1/\gamma} \quad (20)$$

and $$P_{NEW}=P_{OLD}(1-S+SC^{\gamma})^{1/\gamma} \quad (21)$$

Thus, the colour cube 16 is arranged to process data directly from the store 2 in accordance with the equations (20) and (21) and to write the data produced thereby directly into the store 2 without the need for intermediate conversions between colour data and light data.

Consider now the "texturing" equations (13) to (16). Substituting equation (16) into equation (15) gives $$P_{NEW} = 10^{\frac{-(D_{OLD}+Dg)}{\gamma}} \quad (22)$$

Substituting equation (13) into equation (17) gives the equation $$P_{NEW} = \left[10^{-\left(\log\left(\frac{1}{P_{OLD}^\gamma}\right)+Dg\right)}\right]^{\frac{1}{\gamma}} \quad (23)$$

and simplifying gives the equation $$P_{NEW} = 10^{-\frac{Dg}{\gamma}} \cdot P_{OLD} \quad (24)$$

Equation (24) expresses the new pixel value $P_{NEW}$ in terms of the old value $P_{OLD}$, the grain density value Dg and the system gamma γ. It follows that if the system gamma is known the pixel data can be modified with the density data in accordance with equation (24) without first having to convert the pixel colour data into density data.

A common feature of all of the above described system configurations is that the data S from the control store is input to the colour cube 11, 12, 30 together with the image data. The image data is three-dimensional (RGB, CMY, YUV) at least and thus the control data S may be regarded as adding a fourth dimension (at least) to the colour cube. Multi-dimensional space can be difficult to conceptualise. An alternative way of viewing the colour cube is to consider the control data S as modulating the data that would otherwise be output from the colour cube. Another way of looking at it, is to regard the colour cube as a series of three-dimensional colour cubes and the control data as a selector which selects one of the series for use as the colour cube in a given transformation of the data from input to output.

This multi-dimensional nature of the colour cube can be used to good advantage in other situations. For example, the colour cube 30 may be used to calculate the product of two sets of image data $P_1$ and $P_2$ in accordance with the equation $$P_{NEW}=P_A \cdot P_B \quad (25)$$

Applying equation (25) to the data $P_A$ and $P_B$ simulates the laying of two transparencies (corresponding to the two images represented by the data $P_A$ and $P_B$) one over the other on top of a white light source.

Figure 8:
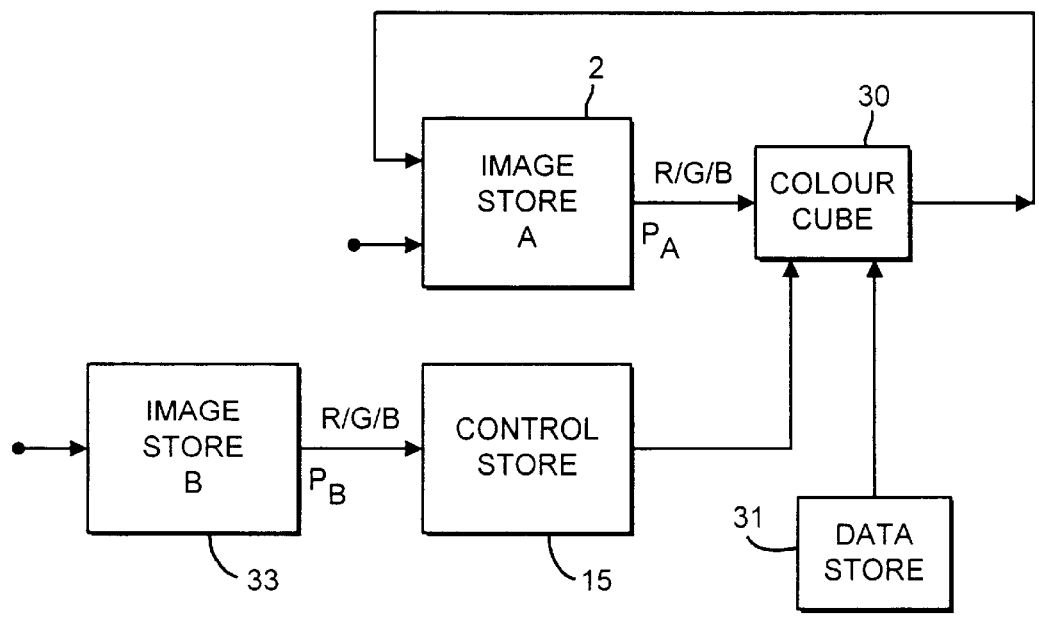
FIG. 8 is a schematic diagram of the portion of the system reconfigured to determine the product of two images.

FIG. 8 of the accompanying drawings shows how the system may be configured to effect the calculation represented by equation (25). Data $P_A$ for one of the images A is held in the image store 2 and data for the other of the images B is held in a second image store or other source 33. The data for the other image B is supplied to the control store 15 one separation (R,G,B) at a time where it is used to modulate the RGB colour data representing the one image A. This requires the image data to be passed through the colour cube 30 three times, once for each of the R, G and B (or other colour format) separations, but offers the advantage that the colour cube can be kept smaller and therefore simpler to construct than if all separations were processed simultaneously. Even with the relatively cheap solid state memory that is currently available, the cost of memory in a colour cube can be a limiting factor. Assuming each separation is represented by 8-bit data, a four-dimensional colour cube would require $(2^8)^4=2^{32}$ (approximately 4.3×10⁹) locations but a six-dimensional colour cube would require $2^{48}$ (approximately 281×10¹²) locations, which is prohibitively expensive using presently available solid state RAM devices. This problem is addressed further in our above-mentioned patent publications GB-A-2,275,584 and U.S. Pat. No. 5,568,596.

Thus, as with the previously described configurations, the FIG. 8 configuration uses data from the control store 15 to modulate the data from the image store 2. It should, however, be noted for the sake of completeness that the execution of equation (25) does not in fact require the system gamma to be known. This is because $$L_{OUT} = L_A \cdot L_B \quad (26)$$

but from equation (1) it can be shown that $$L_{OUT} = P_A^\gamma \cdot P_B^\gamma$$

However, $P = L^{1/\gamma}$ and therefore it follows that $$P_{OUT} = (P_A^\gamma \cdot P_B^\gamma)^{1/\gamma}$$

which simplifies to $$P_{OUT} = P_A \cdot P_B$$

In other words no conversion into light values is required and therefore knowledge of the gamma value is not necessary when calculating the product of two images A and B.

This technique of individually processing each colour separation can, however, be applied to advantage in the above described graining effect in order to achieve an even more photorealistic result. A photographic image is made up of grains of different colours. It follows that if the red (say) separation is processed with one grain texture and the green and blue separations are processed with other grain textures, then the resulting image will contain red areas with red noise, green areas with green noise and blue areas with blue noise. That is to say, in areas containing red components some grains will appear slightly brighter red and other grains will appear slight darker red (i.e. the colour will move toward cyan which contains no red). On average the overall redness of the image area will remain the same.

Having thus described the present invention by reference to preferred embodiments it is to be well understood that the embodiments in question are exemplary only and the medications and variations such as will occur to those possessed of appropriate knowledge and skills may be made without departure from the spirit of the invention as set forth in the appended claims and equivalents thereof.

This application is based on British Patent Application No. 9711281.7 filed May 30, 1997 which is incorporated herein by reference.

What is claimed is:

1. An electronic graphic system for processing image data defining colour values of a multiplicity of pixels that together form an image, in which system the image data is processed with other image data, which processing is effected on a pixel-by-pixel basis depending on control data and on a predetermined gamma factor defining a relationship between colour values and corresponding light values, the processing thereby producing processed colour value data representing a manipulated version of the image in which the light content of pixels has been varied by the other image data depending on the control data and the gamma factor.

2. An electronic graphic system as claimed in claim 1, wherein the data is processed by way of a processing circuit.

3. An electronic graphic system as claimed in claim 2, wherein the processing circuit comprises a colour cube circuit arranged to respond to the colour value data, the gamma factor and the control data by outputting processed colour value data.

4. An electronic graphic system as claimed in claim 2, wherein the processing circuit comprises a first colour cube circuit for converting the colour value data into corresponding light value data, a processing unit for processing the light value data depending on the gamma factor and the control data to produce processed light value data, and a second colour cube circuit for converting the processed light value data into processed colour value data.

5. An electronic graphic system as claimed in claim 1, wherein the other image data represents a light value.

6. An electronic graphic system as claimed in claim 1, wherein the other image data defines a multiplicity of pixels that together form another image.

7. An electronic graphic system as claimed in claim 5, wherein the image data and the other image data are processed in accordance with the equation $$P_{NEW} = (P_{OLD}^\gamma (1 + SC^\gamma))^{\gamma/1}$$

or the equation $$P_{NEW} = (P_{OLD}^\gamma (1 - S + SC^\gamma))^{1/\gamma}$$

where $P_{NEW}$ is the processed pixel data, $P_{OLD}$ is the image data,

C is the other image data,

S is the control data, and $\gamma$ is the gamma factor.

8. An electronic graphic system as claimed in claim 1, wherein the other image data defines a multiplicity of pixels that together form an image of a texture to be applied to the image.

9. An electronic graphic system as claimed in claim 8, wherein the image data and the other image data are processed in accordance with the equation $$P_{NEW} = 10^{-\frac{Dg}{\gamma}} \cdot P_{OLD}$$

where $P_{NEW}$ is the processed pixel data, $P_{OLD}$ is the image data, $\gamma$ is the gamma factor, and Dg is the control data and represents the texture to be applied to the image.

10. An electronic graphic system as claimed in claim 9, wherein the control data represents a graining effect to be applied to the image.

11. An electronic graphic system as claimed in claim 9, wherein the image data represents the image as a plurality of colour separations, the control data represents the texture as a corresponding plurality of colour separations, and each image separation is processed separately using the corresponding control data colour separation.

12. An electronic graphic system as claimed in claim 4, wherein the processing unit comprises a spatial filter.

13. An electronic graphic system as claimed in claim 12, wherein the spatial filter is configured to apply a defocusing effect to the light value data from the first colour cube circuit.

14. An electronic graphic system as claimed in claim 1, wherein the image data is held in an image store and the control data is held in a control store.

15. An electronic graphic system as claimed in claim 14, wherein the processed data is written to the image store to replace the corresponding image data previously stored therein.

16. An electronic graphic system as claimed in claim 14, wherein the control store is of a size substantially equal to that of the image store.

17. A method of processing image data defining colour values of a multiplicity of pixels that together form an image, the method comprising processing the image data with other image data on a pixel-by-pixel basis depending on control data and on a predetermined gamma factor defining a relationship between colour values and corresponding light values in the image, and producing processed colour value data representing a manipulated version of the image in which the light content of pixels has been varied by the other image data depending on the control data and the gamma factor.

\* \* \* \* \*